(12) United States Patent
Hirt et al.

(10) Patent No.: US 8,743,926 B2
(45) Date of Patent: Jun. 3, 2014

(54) LIQUID COOLED GLASS METAL ELECTRODE

(75) Inventors: Joseph Hirt, Coldwater, MI (US); John Eiler, Marshall, MI (US)

(73) Assignee: H.C. Starck Inc., Newton, MA (US)

( * ) Notice: Subject to any disclaimer, the term of this patent is extended or adjusted under 35 U.S.C. 154(b) by 753 days.

(21) Appl. No.: 12/853,615

(22) Filed: Aug. 10, 2010

(65) Prior Publication Data

US 2012/0039352 A1 Feb. 16, 2012

(51) Int. Cl.
- C03B 5/027 (2006.01)
- H05B 3/60 (2006.01)
- H05B 7/06 (2006.01)
- H05B 7/08 (2006.01)

(52) U.S. Cl.
USPC ............... 373/36; 373/54; 373/88; 373/90; 373/93

(58) Field of Classification Search
USPC .......... 373/27, 36, 88, 90, 92, 93, 53, 54, 37, 373/38, 91; 65/135.7, DIG. 6
See application file for complete search history.

(56) References Cited

U.S. PATENT DOCUMENTS

| | | | | |
|---|---|---|---|---|
| 2,591,708 A | * | 4/1952 | Lubatti | 373/41 |
| 3,649,733 A | * | 3/1972 | Schlienger | 373/90 |
| RE30,521 E | * | 2/1981 | Faulkner et al. | 373/37 |
| 4,438,518 A | * | 3/1984 | Gaul et al. | 373/39 |
| 4,965,812 A | * | 10/1990 | Sorg et al. | 373/36 |

* cited by examiner

Primary Examiner — Henry Yuen
Assistant Examiner — Hung D Nguyen
(74) Attorney, Agent, or Firm — Bingham McCutchen LLP

(57) ABSTRACT

In various embodiments, an electrode has a shaft extending from an electrode head and a cooling passage extending from an open end disposed at an attachment end of the shaft to a closed end disposed within the electrode head.

7 Claims, 4 Drawing Sheets

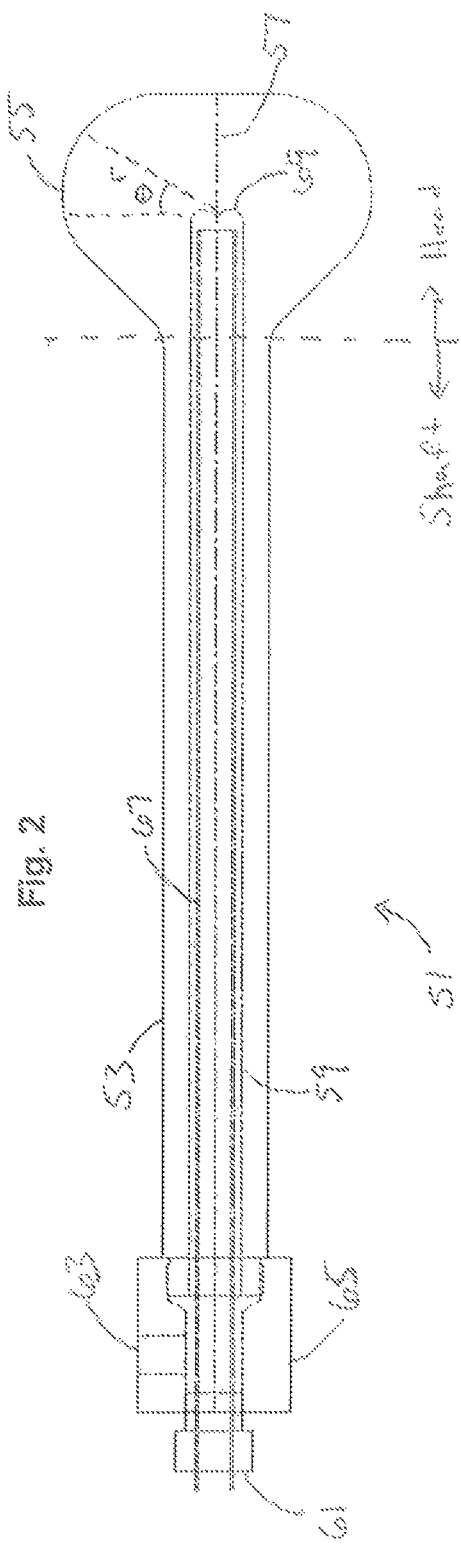

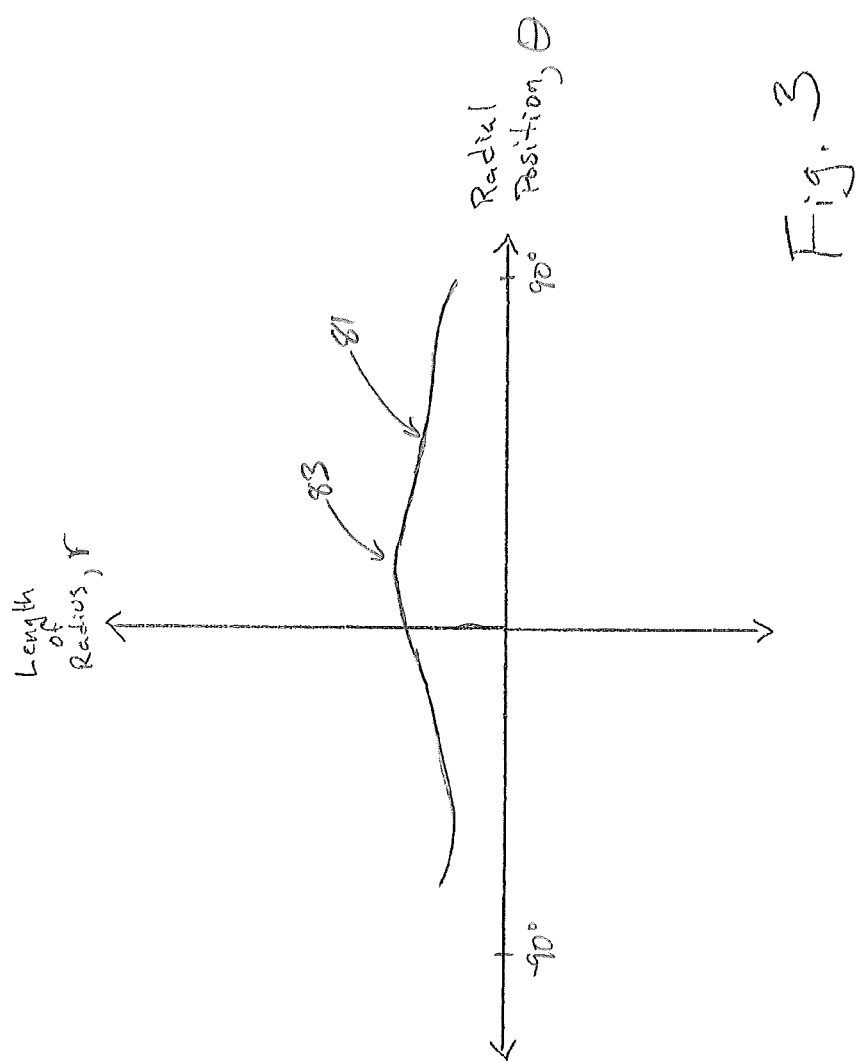

LIQUID COOLED GLASS METAL ELECTRODE

BACKGROUND OF THE INVENTION

1. Field of the Invention

The field of the present invention is liquid cooled electrodes, such as those used in glass melting furnaces.

2. Background

Glass is typically processed by heating and refining in batch within a melting furnace. Glass batches are typically heated from both flames from burners, which serve as the primary heat source, and from glass melt electrodes embedded in the wall of the melting furnace. The number of electrodes depends upon the size of the melting furnace and the characteristics of the glass being processed. These glass melt electrodes introduce additional thermal energy into the furnace by passing a current through the glass melt.

Current state-of-the-art glass melt electrodes use a two piece assembly, having a head, which is typically constructed from a refractory metal (such as molybdenum), affixed to a shaft cooled by an internal passage through which cooling water is passed. This shaft is often constructed from a variety of materials, such as stainless steel, a nickel based alloy, or even molybdenum. Such electrodes are disclosed in U.S. Pat. Nos. 3,983,309, 4,965,812, and U.S. patent application publication No. 20070064763. The disclosures of these documents are incorporated herein by reference in their entirety. Due to the high temperatures existing near the electrodes in the glass melt, a water-tight joint is difficult to achieve between the head and the shaft. Thus, the cooling passage is contained only within the shaft and cannot be extended into the head without compromising the durability of electrode under operating conditions.

SUMMARY OF THE INVENTION

The present invention is directed toward an electrode which is usable in glass furnaces and the like. The electrode includes a shaft extending from an electrode head. A cooling passage extends from an open end disposed at the attachment end of the shaft to a closed end, which is disposed within the electrode head. The electrode head is formed to have approximately a teardrop shape.

The teardrop shape of the electrode head may be formed according to a radial profile rotated about a centerline of the shaft, with the radial profile having a center disposed within at the closed end of the cooling passage and on the centerline. The middle portion of the radial profile may exhibit a single maximum. Alternatively, or in addition, the middle portion of the radial profile may be negatively curved.

Additional options for the electrode may also be incorporated, either alone or in combination. As one option, the closed end of the cooling passage may be formed to have a double "U" shape in cross-section. As another option, the shaft and electrode head may be constructed from a refractory metal, such as molybdenum or a molybdenum alloy.

Accordingly, an improved electrode is disclosed. Advantages of the improvements will appear from the drawings and the description of the preferred embodiment.

BRIEF DESCRIPTION OF THE DRAWINGS

In the drawings, wherein like reference numerals refer to similar components:

FIG. 2 illustrates a one-piece liquid cooled electrode;

FIG. 3 graphically illustrates an electrode head radial profile; and

DETAILED DESCRIPTION OF THE PREFERRED EMBODIMENTS

Figure 1:
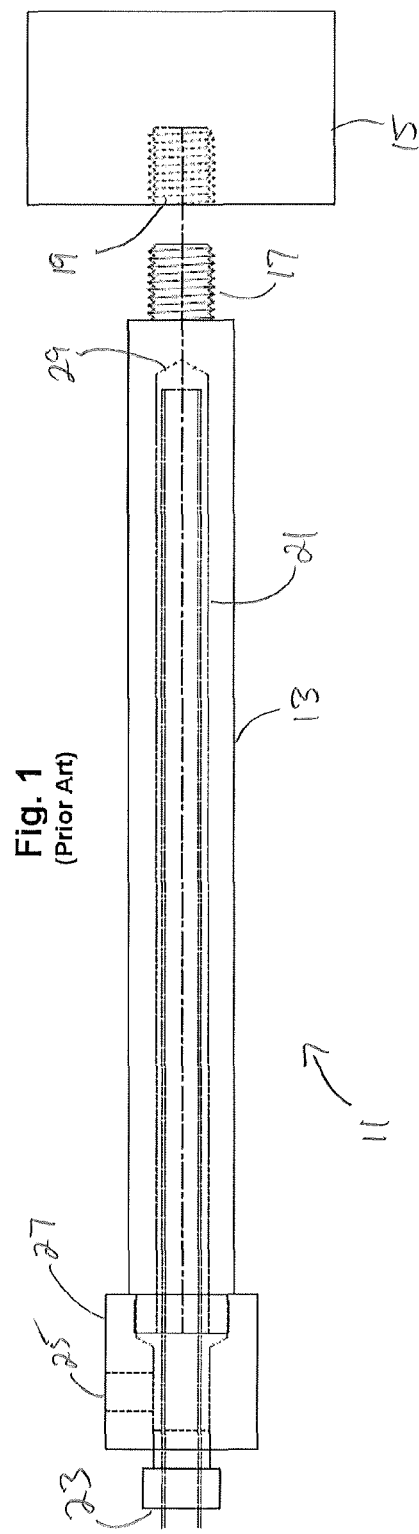
FIG. 1 illustrates a liquid cooled electrode found in the prior art.

Turning in detail to the drawings, FIG. 1 illustrates a liquid cooled electrode 11 as is known in the prior art. The electrode 11 includes a liquid-cooled shaft 13 which is attached to the electrode head 15 via a threaded tip 17 inserted into a complimentary threaded receptacle 19. The shaft 13 has a cooling passage 21 extending substantially along its entire length. The cooling passage 21 includes an inlet 23 and an outlet 25 at the attachment end 27 of the shaft 13. Since the cooling passage 21 is normally machined into the shaft 13, the closed end 29 of the cooling passage 21, takes on the form of the tip of the drill bit used to drill the passage 21. During use, a coolant delivery tube 31 is inserted into the passage 21, through the inlet 23, so that it extends nearly to the closed end 29. Liquid coolant, typically water, is delivered into the closed end 23 of the passage 21 via the tube 31. The tube 31 has a smaller overall diameter than the passage 21, thereby allowing the coolant to return down the passage 21 and exit through the outlet 25.

A single piece electrode 51 is illustrated in FIG. 2. Here, the shaft 53 and the electrode head 55 are constructed out of one piece of material. The entire electrode 51 is symmetrical about the centerline 57. A cooling passage 59 is formed down the length of the shaft 53 and extends into the electrode head 55. The cooling passage 59 includes an inlet 61 and an outlet 63 at the attachment end 65 of the shaft 53. As with the electrodes of the prior art, a coolant delivery tube 67 is inserted into the passage 57 during use for the delivery of a liquid coolant through the inlet 61. Here too, the tube 67 has a smaller overall diameter than the passage 59 so that the coolant can return down the passage 59, between the outer wall of the tube 67 and the inner wall of the passage 59, and exit through the outlet 63.

The electrode head 55 is roughly "teardrop" shaped, and the passage 59 extends about halfway into the electrode head 55, although the passage may extend as deeply into the electrode head based upon desired design specifications. With the closed end 69 of the passage 59 placed in this manner, the cooling of the entire electrode head is improved over the two-piece electrodes of the prior art. Elimination of the joint between the shaft and the electrode head also improves heat transfer from the electrode head into the shaft, thereby increasing the efficiency of overall heat dissipation for the electrode. Elimination of this joint also serves to remove a potential point of mechanical failure.

The teardrop shape of the electrode head 55 serves to add longevity to the life of the electrode. This is thought to be the result of better control of localized thermal gradients within the electrode head. By reducing significant localized thermal gradients in the electrode head, longer life spans have been observed in these electrodes before cracks begin appearing on the outside of the electrode head. Whereas some prior art electrodes are known to have a lifespan of about 45 minutes under certain use conditions, electrodes having a teardrop shaped head have been observed to have a lifespan on the order of 1-3 weeks, under the same use conditions, before cracks appeared in the electrode head. As those skilled in the art will recognize, the use conditions of the electrode play a significant role in the lifespan of the electrode. These conditions may include the type of glass or ceramic mixture being melted and the temperature at which the melt is maintained, among other things.

The teardrop shape of the electrode head 55 is represented by the radial profile 81 shown in FIG. 3. For purposes of this description and to highlight certain features, the radial profile 81 is shown on a Cartesian coordinate system, with θ=0° being perpendicular to the centerline 57 of the electrode. The radial profile 81 takes the shape of the electrode head shown in FIG. 2 when the radial profile is shown in a polar coordinate system. This radial profile 81 representation of the electrode head has it's radial center located along the centerline 57 of the electrode 51 at the closed end 69 of the cooling passage 59. In this radial profile 81 representation, the vertical axis is the length of the radius, r, and the horizontal axis is the radial position, θ. The overall shape of the electrode head 55 can be represented by rotating this radial profile 81 (based on polar coordinates) about the centerline 57 of the electrode 51. The features of this radial profile that are believed to contribute to the longevity of the electrode, as compared to electrodes of the prior art, are the reduced variation in the distance of the exterior of the electrode head from the cooling shaft, the smooth transition in the radial profile, i.e., the lack of cusps that would be caused by corners or hard edges formed in the electrode head, and the presence of a single maximum 83 in the radial profile 81. As shown in FIG. 3, this single maximum is located at about θ=15°, although it is anticipated that this maximum could be located nearly anywhere within a middle range of the radial profile, from about −30° to 30°. This maximum also means that this portion of the radial profile is negatively curved, unlike the radial profile of the electrode head depicted in FIG. 1. Preferably, the entire middle portion of the radial profile is negatively curved, i.e., the radial profile curves downward. The ends of the radial profile, located closer to θ=90° and θ=−75°, may be slightly positively curved. As shown in FIG. 3, the radial profile remains negatively curved at θ=90°, and transitions to a slight positive curve around θ=−75°. This transition to a slight positive curve at around θ=−75° results from the transition between the electrode head 55 and the shaft 53. Experimentally, the electrode head depicted in FIG. 2, for which the radial profile 81 is a representation, has exhibited the greatest longevity.

The one piece electrode may be manufactured using a controlled partial extrusion process, which is well known to those of skill in the art. While any refractory metal may be used, for glass or ceramics melting applications, molybdenum or a molybdenum alloy is preferred. This process results in a near net shape part which then undergoes rotary forging to properly size the electrode and straighten the shaft. The electrode is then subjected to final machining to form the connection end and the cooling passage.

Figure 4B:
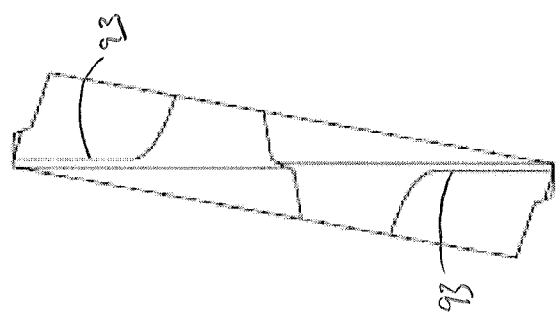
FIGS. 4A & 4B illustrate a drill head for forming the closed end of the cooling passage.
Figure 4A:
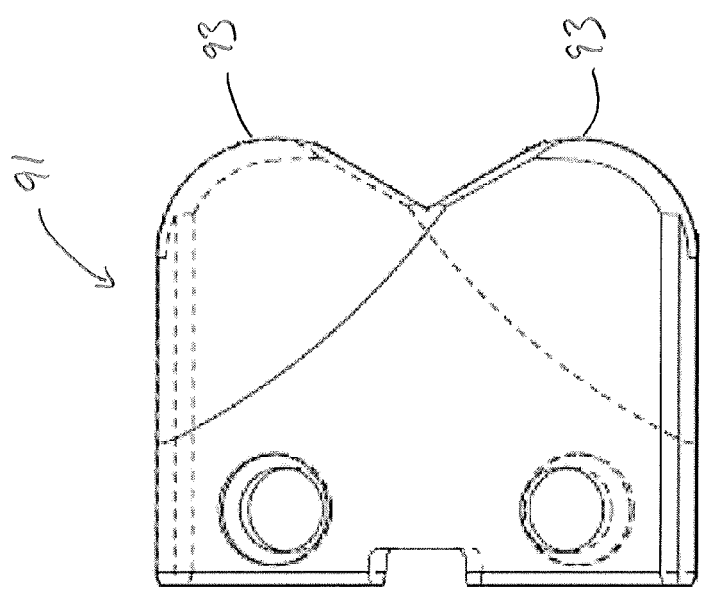

The closed end of the cooling passage is formed using the specially developed flat drill head 91 shown in FIGS. 4A & 4B. FIG. 4A shows a side view of the drill head 91, showing the dual blades 93 that are appropriately rounded to provide the double "U" shape to the closed end 69 of the cooling passage 59. The dual cutting edges 93 have fairly large radii and converge in the center of the drill head at an inward-facing 120° angle. FIG. 4B shows a top planar view of the drill head 91, showing the formation of the dual cutting edges 93 and flutes. The curvature of the cutting edges 93 and the angle at which they converge may be made according to desired design specifications. Those of skill in the art will recognize that the angle and curvature of the cutting edges may depend upon such things as operating temperature of the electrode, the type of cooling liquid used, and the rate of flow of the cooling liquid, among other things. By making the closed end in this double "U" configuration, even fluid flow is promoted at the closed end of the cooling passage, thereby reducing, and possibly eliminating, hot spots which may lead to localized boiling of the coolant. Such hot spots can lead to cracking and degradation, resulting in erosion of the electrode from the inside out. The double "U" configuration of the closed end therefore aids in reducing mechanical stresses to which the electrode is subjected and in increasing the overall longevity of the electrode.

Through the manufacturing processes described above, the electrode head and connection end may be constructed so that the electrode can serve as an appropriate replacement part in nearly any furnace.

Thus, an electrode is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. An electrode for immersion in a molten medium, the electrode comprising:
   an elongated shaft;
   an electrode head (i) having an approximately teardrop shape with a smoothly rounded, corner-free outer contour, and (ii) being disposed at an end of the shaft opposite an attachment end of the shaft, the electrode head and the shaft being constructed out of one piece of material; and
   a cooling passage extending from an open end disposed at the attachment end of the shaft to a closed end disposed within the electrode head,
   wherein (i) the outer contour of the electrode head is defined by a cusp-free radial profile rotated about a centerline of the shaft, (ii) the radial profile has a center disposed at the closed end of the cooling passage and on the centerline of the shaft, (iii) the radial profile exhibits a single maximum value at an angle θ from a perpendicular to the centerline of the shaft, (iv) the single maximum value of the radial profile falls within a middle portion of the radial profile extending from an angle of 30° from the perpendicular to the centerline of the shaft to an angle of −30° from the perpendicular to the centerline of the shaft, and (iv) the middle portion of the radial profile is negatively curved.

2. The electrode of claim 1, wherein the closed end has a double "U" shape in cross-section.

3. The electrode of claim 1, wherein the shaft and the electrode head are constructed from a refractory metal.

4. The electrode of claim 3, wherein the refractory metal is molybdenum.

5. The electrode of claim 3, wherein the refractory metal is a molybdenum alloy.

6. The electrode of claim 1, wherein the angle θ is approximately 15°.

7. The electrode of claim 1, wherein (i) the radial profile has a first end at an angle of approximately 90° from the perpendicular to the centerline of the shaft and a second end at an angle of approximately −75° from the perpendicular to the centerline of the shaft, and (ii) the radial profile is positively curved at the first and second ends.

\* \* \* \* \*

UNITED STATES PATENT AND TRADEMARK OFFICE
CERTIFICATE OF CORRECTION

| | | |
|---|---|---|
| PATENT NO. | : 8,743,926 B2 | Page 1 of 1 |
| APPLICATION NO. | : 12/853615 | |
| DATED | : June 3, 2014 | |
| INVENTOR(S) | : Joseph Hirt et al. | |

It is certified that error appears in the above-identified patent and that said Letters Patent is hereby corrected as shown below:

On the title page, item (54), and in the specification, column 1, line 1, delete "LIQUID COOLED GLASS METAL ELECTRODE" and replace with --LIQUID COOLED GLASS MELT ELECTRODE--

Signed and Sealed this

Fourth Day of November, 2014

Michelle K. Lee
*Deputy Director of the United States Patent and Trademark Office*